(12) United States Patent
Elliott

(10) Patent No.: US 9,681,091 B2
(45) Date of Patent: Jun. 13, 2017

(54) SYSTEM AND METHOD FOR ENHANCED REMOTE TRANSCODING USING CONTENT PROFILING

(75) Inventor: Thomas Edward Elliott, Burbank, CA (US)

(73) Assignee: THOMSON LICENSING, Issy les Moulineaux (FR)

( * ) Notice: Subject to any disclaimer, the term of this patent is extended or adjusted under 35 U.S.C. 154(b) by 724 days.

(21) Appl. No.: 13/980,681

(22) PCT Filed: Jan. 20, 2012

(86) PCT No.: PCT/US2012/021959
§ 371 (c)(1),
(2), (4) Date: Jul. 19, 2013

(87) PCT Pub. No.: WO2012/100117
PCT Pub. Date: Jul. 26, 2012

(65) Prior Publication Data
US 2013/0293774 A1    Nov. 7, 2013

Related U.S. Application Data

(60) Provisional application No. 61/434,977, filed on Jan. 21, 2011.

(51) Int. Cl.
H04N 7/01        (2006.01)
H04N 21/2343    (2011.01)
(Continued)

(52) U.S. Cl.
CPC .............. *H04N 7/01* (2013.01); *H04N 19/40* (2014.11); *H04N 19/46* (2014.11);
(Continued)

(58) Field of Classification Search
CPC ...................................................... H04N 7/01
See application file for complete search history.

(56) References Cited

U.S. PATENT DOCUMENTS

| 6,184,935 B1 | 2/2001 | Iaquinto et al. |
| 7,088,780 B2 | 8/2006 | Vetro et al. |

(Continued)

FOREIGN PATENT DOCUMENTS

| AU | 2005202313 | 6/2005 |
| CN | 101193289  | 6/2008 |

(Continued)

OTHER PUBLICATIONS

Search Report Dated: Jun. 13, 2012.
(Continued)

*Primary Examiner* — James Pontius
(74) *Attorney, Agent, or Firm* — Brian J. Dorini; Patricia A. Verlangieri

(57) ABSTRACT

A system and method as described herein involve materially improving the quality of encoded content generated on systems or platforms such as remote or CPE (Customer Premises Equipment) platforms. An aspect of the described system and method comprises profiling the source content, for example, on a per title basis, and generating profile information as a set of metadata that reflects the optimal transcoding parameters. This metadata is transmitted along with the content to be transcoded to the remote device which can then perform a superior process on the content, compared to a generic non-hinted transcode. Other aspects of the described system and method comprise separation of profiling analysis from the actual transcoding at a remote location, and encapsulation of profile information with the program content for delivery to the remote premises.

14 Claims, 7 Drawing Sheets

(51) Int. Cl.
  *H04N 21/258* (2011.01)
  *H04N 19/46* (2014.01)
  *H04N 19/40* (2014.01)
(52) U.S. Cl.
  CPC ... *H04N 21/2343* (2013.01); *H04N 21/25825* (2013.01); *H04N 21/25833* (2013.01)

(56) References Cited

U.S. PATENT DOCUMENTS

| | | | |
|---|---|---|---|
| 8,194,997 | B2 | 6/2012 | Segall et al. |
| 8,879,635 | B2 | 11/2014 | Raveendran et al. |
| 2006/0126736 | A1 | 6/2006 | Shen |
| 2008/0235746 | A1 | 9/2008 | Peters et al. |
| 2009/0154556 | A1 | 6/2009 | Kim et al. |
| 2010/0017516 | A1 | 1/2010 | Sparrell et al. |
| 2010/0020886 | A1 | 1/2010 | Raveendran et al. |
| 2010/0254453 | A1* | 10/2010 | Dane .................. H04N 7/0112 375/240.12 |
| 2010/0309975 | A1 | 12/2010 | Zhou et al. |
| 2011/0246673 | A1* | 10/2011 | Kishore ................ H04L 65/602 709/247 |

FOREIGN PATENT DOCUMENTS

| | | |
|---|---|---|
| CN | 101404652 | 4/2009 |
| EP | 2271098 | 1/2011 |
| JP | 2001506099 | 5/2001 |
| JP | 2002044622 | 2/2002 |
| JP | 2003527005 | 9/2003 |
| JP | 2004520771 | 7/2004 |
| JP | 2007257641 | 10/2007 |
| JP | 2009510933 | 3/2009 |
| JP | 2009147902 | 7/2009 |
| JP | 2012516661 | 7/2012 |
| WO | WO-0169936 A2 | 9/2001 |
| WO | WO-2007114995 A1 | 10/2007 |
| WO | WO2009128528 | 10/2009 |
| WO | WO2010088530 | 8/2010 |

OTHER PUBLICATIONS

Hata, et al; "Object-Based Video Monitoring System-System and feature characteristics;" Proceedings of the 2005 IEICE General Conference, Volume: Information/System 2, IEICE, p. 78; Mar. 7, 2005.

Yamada; "International Standardization in Video Archive;" Image Lab, Jun. 2002 issue (vol. 13, No. 6), Japan Industrial Publishing Co., Ltd.; pp. 36-39; Jun. 1, 2001.

Saito et al., "EC and information Distribution How Electronic Commerce Is Changing Society", NetCom Library, Tokyo, Japan, Jun. 20, 2001, pp. 75-76.

Hosomi et al., "Cyber Kansai Project 16", UNIX Magagine, vol. 15, No. 9, Sep. 1, 2000, pp. 158-166.

* cited by examiner

SYSTEM AND METHOD FOR ENHANCED REMOTE TRANSCODING USING CONTENT PROFILING

CROSS-REFERENCE TO RELATED APPLICATIONS

This application claims the benefit, under 35 U.S.C. §365 of International Application PCT/US2012/021959, filed Jan. 20, 2012, which was published in accordance with PCT Article 21(2) on Jul. 26, 2012 in English and which claims the benefit of U.S. provisional patent application No. 61/434,977, filed Jan. 21, 2011.

FIELD OF THE INVENTION

The present principles relate to a system and method for improving the quality of program content transcoded on remote or Customer Premises Equipment platforms.

BACKGROUND OF THE INVENTION

Program content, for example, video/audio program material, originates at a source location, typically in a single format. The content can be delivered in one format to a remote or customer premises location where it needs to be transformed into other formats suitable for viewing on a variety of devices. These typically include television sets, computers, tablet devices and smartphones. The technical, visual and aural capabilities of these devices vary dramatically, and often the original content is not well adapted for consumption by these alternate devices.

The recent introduction of relatively low cost, high powered platforms in Customer Premises Equipment (CPE), on which transcoding from one format to another format can occur, has presented the industry with the new challenge of ensuring simultaneous high quality delivery of content to multiple divergent devices. An aspect of the system and method described herein addresses the problem of improving the quality of program content transcoded on remote systems or CPE platforms.

SUMMARY OF THE INVENTION

The principles described herein relate to remote transcoding using content profiling. By profiling the source content and pre-defining a set of parameters, the "enhanced" or "hinted" content can be transcoded by a remote application at a far higher quality than could be obtained using generic and static profiles. The set of parameters can include, but is not limited to, aspect ratio, crop, scale, encoding bit rate, color gamut, noise reduction, and pre-filtering.

In addition, the capability of a remote transcoding application to measure, for example, the available bandwidth and quality of connection between the transcoder and the endpoint device provides the ability for an adaptable transcode. The bandwidth and other transcoding parameters can be adjusted in real time to better match the instantaneous capabilities of the connection to the endpoint display, providing the best possible viewing quality at any moment in time. This generates the opportunity for multiple simultaneous transcodes to take place thereby providing high quality experience for different devices at the same time.

According to one aspect of the present principles, there is provided a method for transcoding program content. The method comprises a step for selecting a set of parameters defining display characteristics of video program content, a step of populating a transcoding profile with the parameters, a step of transmitting the populated transcoding profile to a second display device, and a step for transcoding the video program content based on the profile parameters to be appropriately viewed on a second device.

According to another aspect of the present principles, there is provided a further method for processing video program content. The method comprises the steps of receiving a transcoding profile, a step of extracting a set of parameters from the transcoding profile, a step of transcoding the program content based on the parameters to be appropriate for display on a second device, and a step of displaying the program content in accordance with the parameters.

According to another aspect of the present principles, there is provided a further method for processing video program content. The method comprises the steps of selecting a set of parameters defining the display characteristics of video content, a step of transmitting the parameters to a second display device, a step of transcoding the video content by using the parameters, and a step of displaying the video program content in accordance with the parameters.

According to another aspect of the present principles, there is provided an apparatus for processing video program content. The apparatus is comprised of a parameter selection unit for selecting parameters that define the display characteristics of video content. The apparatus is further comprised of a profile generator to populate a transcoding profile with at least one parameter. The apparatus is further comprised of a transmission unit for transmitting the populated transcoding profile to a second display device, and a transcoder for operating on the video program content based on at least one parameter for appropriate display on a second device.

According to another aspect of the present principles, there is provided an apparatus for displaying video program content. The apparatus is comprised of a receiver for receiving a transcoding profile including a set of parameters for transcoding video program content to be appropriate for use with a second display device. The apparatus is further comprised of an extractor for obtaining the parameters from the transcoding profile. The apparatus is further comprised of a transcoder that operates on the video program content based on the parameters from the transcoding profile. The apparatus is further comprised of a display device the displaying the transcoded video content.

According to another aspect of the present principles, there is provided a further apparatus for displaying program content. The apparatus is comprised of a parameter selection unit to select a set of parameters defining the display characteristics of video program content. The apparatus is further comprised of a transmission unit for transmitting the parameters to a display device. The apparatus is further comprised of a transcoder operating on the program content based on the set of parameters. The apparatus is further comprised of a display device for displaying the video program content, transcoded in accordance with the parameters.

A need exists for program content, generated at a source location in one format, to be transcoded to alternate formats for use on remote devices. These devices include, for example, televisions, computers, smartphones, and tablets. These and other aspects, features and advantages of the present principles will become apparent from the following detailed description of exemplary embodiments, which are to be read in connection with the accompanying drawings.

DETAILED DESCRIPTION

The principles described herein satisfy the need and solve the fundamental problems associated with a system and method for improving the quality of program content transcoded on remote or Customer Premises Equipment (CPE) platforms.

The described systems and methods presented herein comprise a Profiling portion and an Enhanced Transcoding portion.

Profiling is performed by a series of analytical operations on each piece of content (video and audio) that will be sent to a remote device for Enhanced Transcoding. Profiling can be a combination of human and machine operations, with the bulk of the analysis performed by automated computer applications, for example.

Profiling can include, but is not limited to, the following set of parameters:

Class of Material—Drama, Sport, Action, etc. (the class of source material affects general transcoding parameters such as bit rate, motion estimation, etc.)

Aspect Ratio—ratio of horizontal to vertical dimensions of the source material

Resolution—size in pixels of the source frame

Frame Rate—frames per second of the source material

Frame Sequence—"3:2 pulldown" and other such frame/field sequences

Progressive/Interlace—frame structure of the source content

Color Gamut—color space of the source material (such as RGB, YCrCb, Rec709, XYZ, 601, etc.)

Noise—amount of video noise or film grain present in the source material

Bit Depth—whether the source content is 8-bit or 10-bit

Animation or Live Action—this choice can affect transcoding settings

Figure 1:
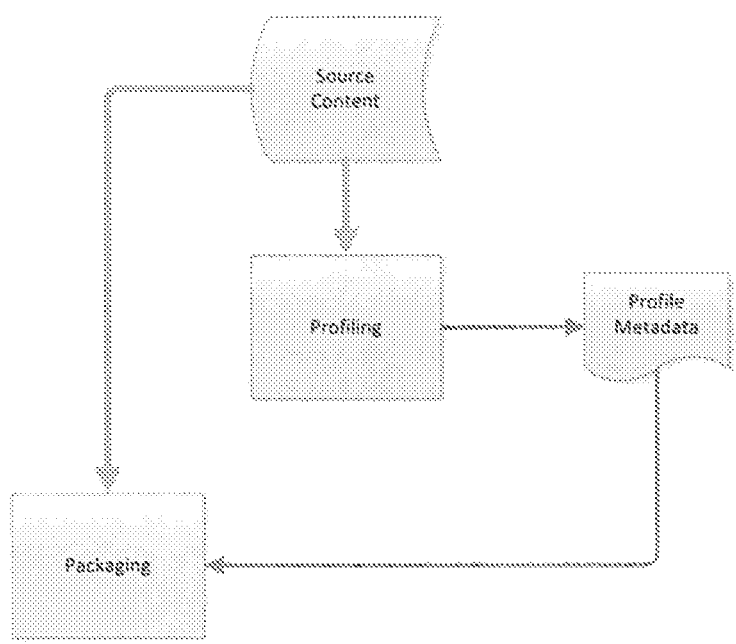
FIG. 1 shows a block diagram of a profiling portion, in accordance with the present principles.

Prefiltering Requirements—analysis of the source material, by human and/or machine processes, will reveal the type of pre-filtering that can be used to enhance the transcoding process As shown in FIG. 1, once the Profiling process is complete, all of the Profiling decisions can be encoded into a metadata set that reflects the necessary adjustments to be made by the target transcoding platform (remote or CPE platform). The metadata schema is collectively understood by both the Profiling application and the Enhanced Transcoding application. For example, the metadata can be in XML format, using an XML Schema for validation.

Also, as shown in FIG. 1, the metadata can be packaged and transported along with the source content to the remote or CPE platform using a variety of methods, depending on the requirements of the NSP (Network Service Provider) or other network to be traversed. Typical methods include Private Stream within an MPEG-2 Transport Stream, Private Metadata within an MP4 container, Dark Metadata within MXF (Material Exchange Format), but other container formats for multiplexing digital audio, video and/or data content are considered within the scope of the present principles.

When this metadata is received along with the transmitted source content, the static/generic transcode profile(s) in the remote or CPE platform is (are) overwritten by the title-specific metadata comprising the profile information. This configures the transcoder or repurposing engine to make the highest quality set of outputs for local divergent platforms.

Figure 2:
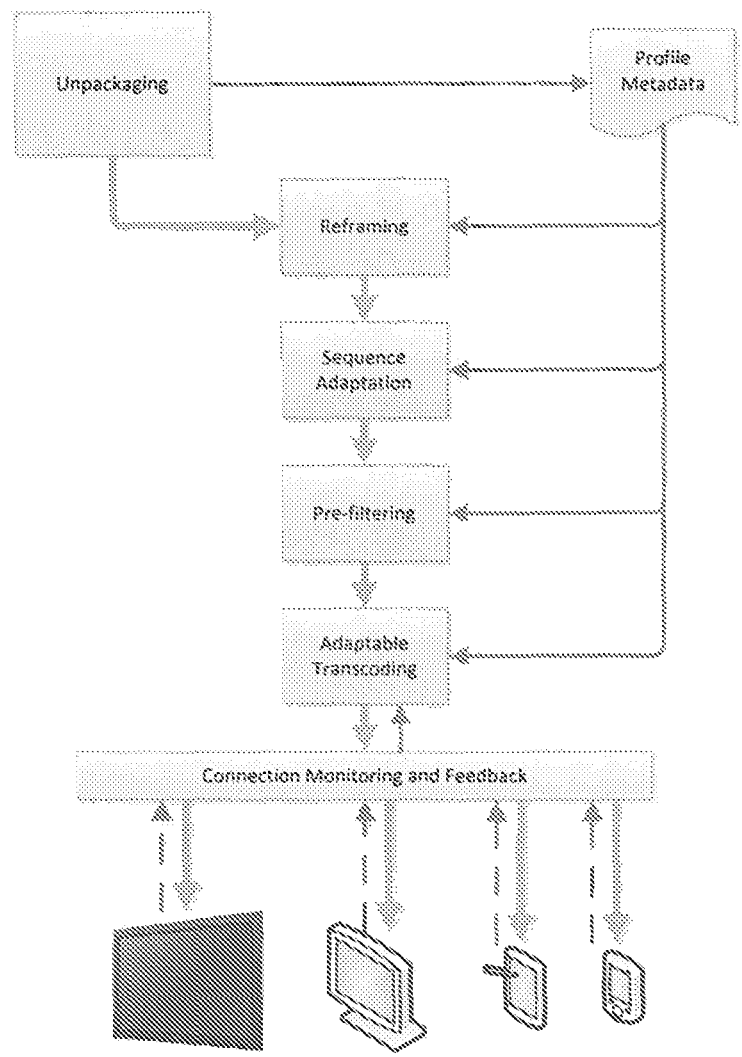
FIG. 2 shows the sequence of a profiling application, in accordance with the present principles.

As shown in FIG. 2, an aspect of the described system and method concerns the sequence and methodology of application of the profiling metadata by the target transcoding platform. For instance, dynamic reframing can be applied before the actual video transcode to remove portions of the source picture frame that will not be required in the output frame. This process ensures a higher quality by not wasting bits in the transcode that would ultimately be discarded. While the actual processing sequence can vary due to technical constraints of the transcoding platform, an example of the general sequence of the Profiling application can be as follows:

Dynamic Reframing—Removal of bits not required in an output frame

Sequence Adaptation—"Inverse telecine" or "3:2 pull-down removal", etc.

Pre-filtering—Gaussian edge shaping, noise reduction, bandwidth shaping, etc.

Transcoding—Decoding and re-encoding the video and audio content for delivery to the endpoint devices.

Adaptable Transcoding—Based on dynamic measurement of the endpoint device connections, bandwidth, etc. and adjustment, as required, of the transcode in order to deliver the highest quality signal over the available bandwidth and quality of connection for that particular endpoint device.

Figure 3:
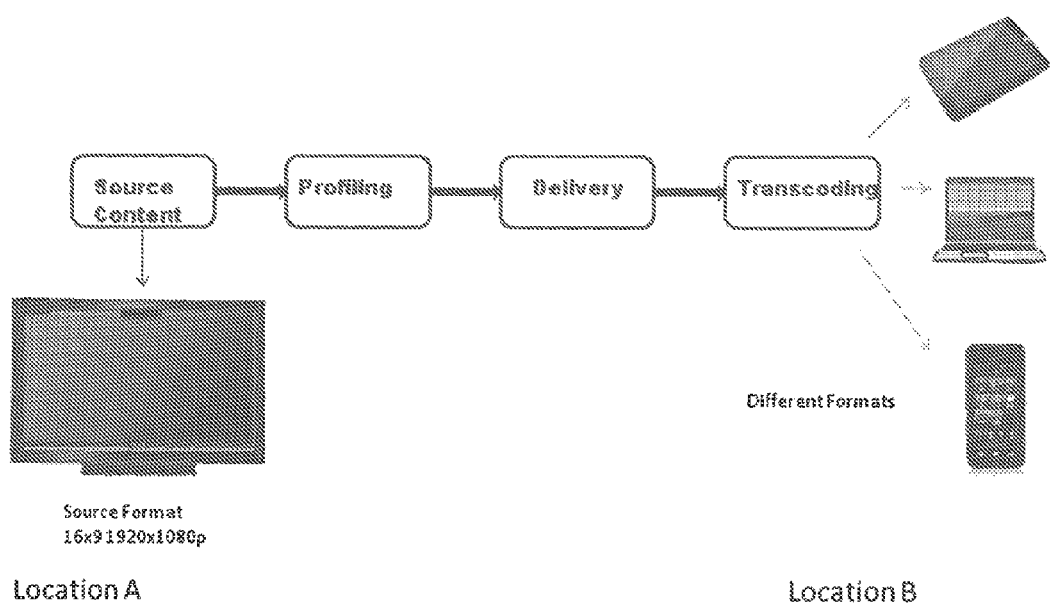
FIG. 3 shows a block diagram example illustrative of the present principles.

FIG. 3 shows a block diagram illustrating an example of the principles described herein. Source content is generated at Location A in a 16×9, 1920(H)×1080(V) progressive format. The content is profiled and sent along with the profile information to Location B, where the content is transcoded using the profile information for each different format needed by a different endpoint device. Such devices can be tablets, laptop computers, or smartphones, for example.

Figure 4:
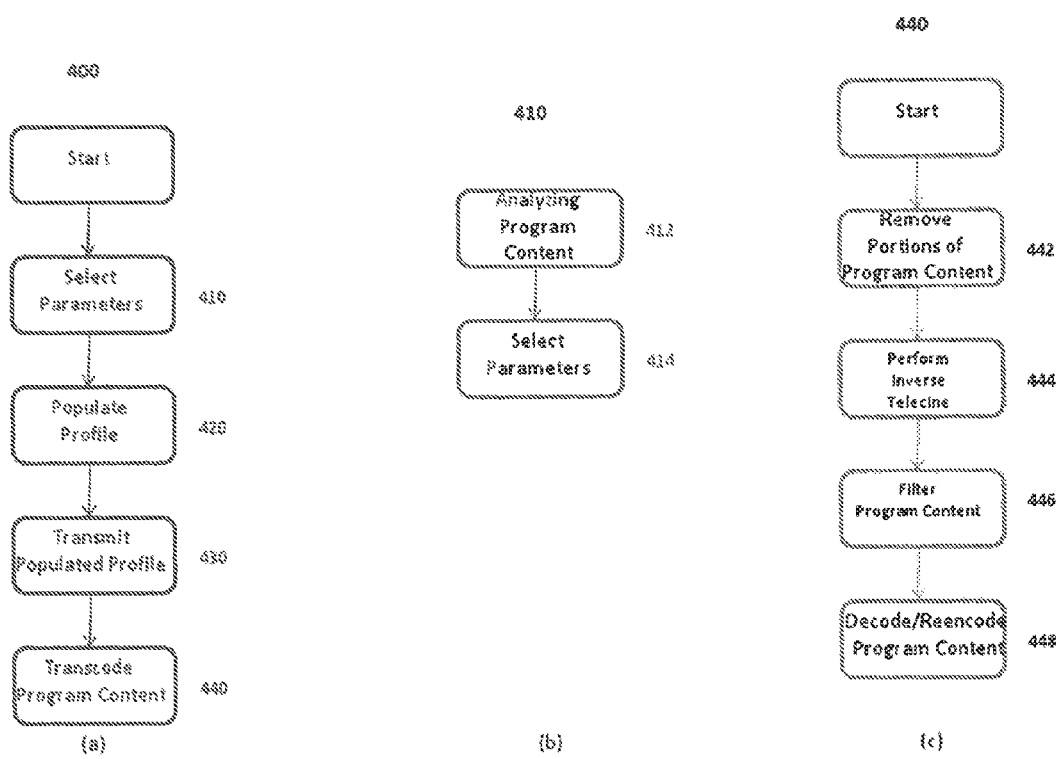
FIGS. 4a, b, and c show exemplary embodiments of a method for processing video program content, in accordance with the present principles.

One embodiment of the present principles is shown in FIG. 4(a), which is a method 400 for processing video program content. The method comprises the step 410 of selecting a set of parameters defining the display characteristics of the video program content. The method is also comprised of the step 420 of populating a transcoding profile with at least one selected parameter in the set of parameters and a step 430 of transmitting the populated transcoding profile to a second display device. The method is also comprised of a step 440 of transcoding the program content based on at least one of the selected parameters so that the video program content is appropriate for a second display device.

An exemplary embodiment of a method 410 which further comprises the method of FIG. 4(a), 400, is shown in detail in FIG. 4(b). The method includes a step 412 of analyzing the program content and a step 414 of selecting the set of parameters responsive to the analyzing step.

FIG. 4(c) shows one embodiment of a method 440 for transcoding program content. This method is one possible embodiment of the transcoding step 440 of FIG. 4(a). The method is comprised of a step 442 for removing portions of the program content that will not be required after transcoding. The method is further comprised of a step 444 for performing an inverse telecine operation on the program content and a step 446 for filtering the program content. The method is further comprised of a step 448 of decoding and re-encoding said program content based on said profile information to optimize quality for use on an endpoint device.

Figure 5:
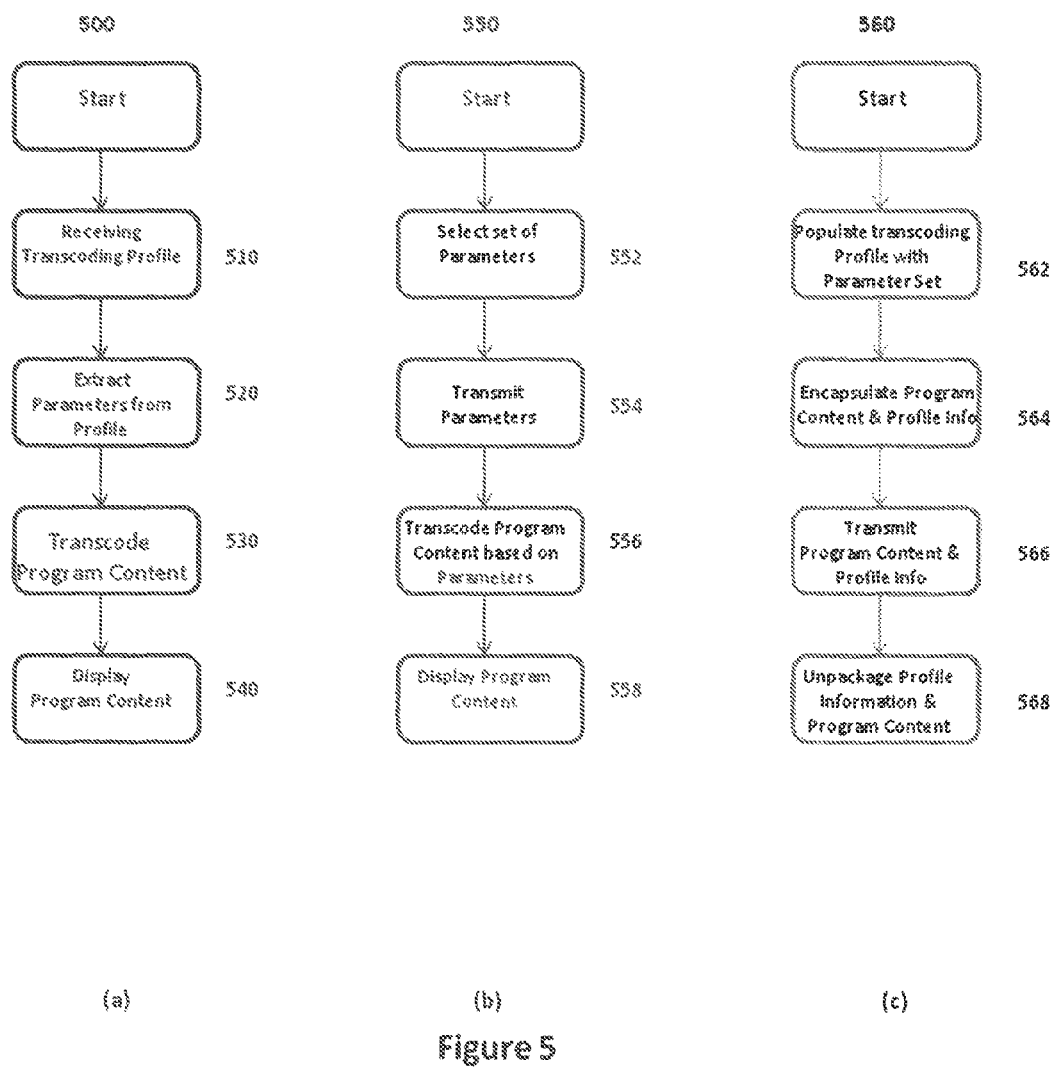
FIGS. 5a, b, and c show exemplary embodiments of a method for displaying video program content, including packaging of program content and profile information in accordance with the present principles.

Another exemplary embodiment of a method 500 for displaying video program content in accordance with the present principles is shown in FIG. 5(a). The method comprises a step 510 for receiving a transcoding profile. The method is further comprised of a step 520 of extracting a set of parameters from the transcoding profile. The method is also comprised of a step 530 of transcoding the program content based on the parameters from the transcoding profile to be appropriate for use with a second display device. The method is further comprised of a step 540 of displaying the video program content on a second display device in accordance with the parameters from the transcoding profile.

FIG. 5(b) shows an exemplary embodiment of a method 550 for displaying program content in accordance with the present principles. The method is comprised of the step 552 of selecting a set of parameters defining the display characteristics of video program content. The method is further comprised of a step 554 of transmitting said parameters to a second display device and a step 556 of transcoding the video program content based on the selected parameters. The method is further comprised of a step 558 of displaying the video program content on a second display device in accordance with the parameters.

Another embodiment of the present principles is illustrated in FIG. 5(c) which shows a method 560 further comprising the method of FIG. 5(b) in accordance with the present principles. The method is comprised of the aforementioned steps, but is further comprised of a step 562 of populating a transcoding profile with a set of parameters, a step 564 of encapsulating the profile and the video program content, a step 566 of transmitting the profile to a second display device, and a step 568 of unpackaging the encapsulated profile and video program content.

Figure 6:
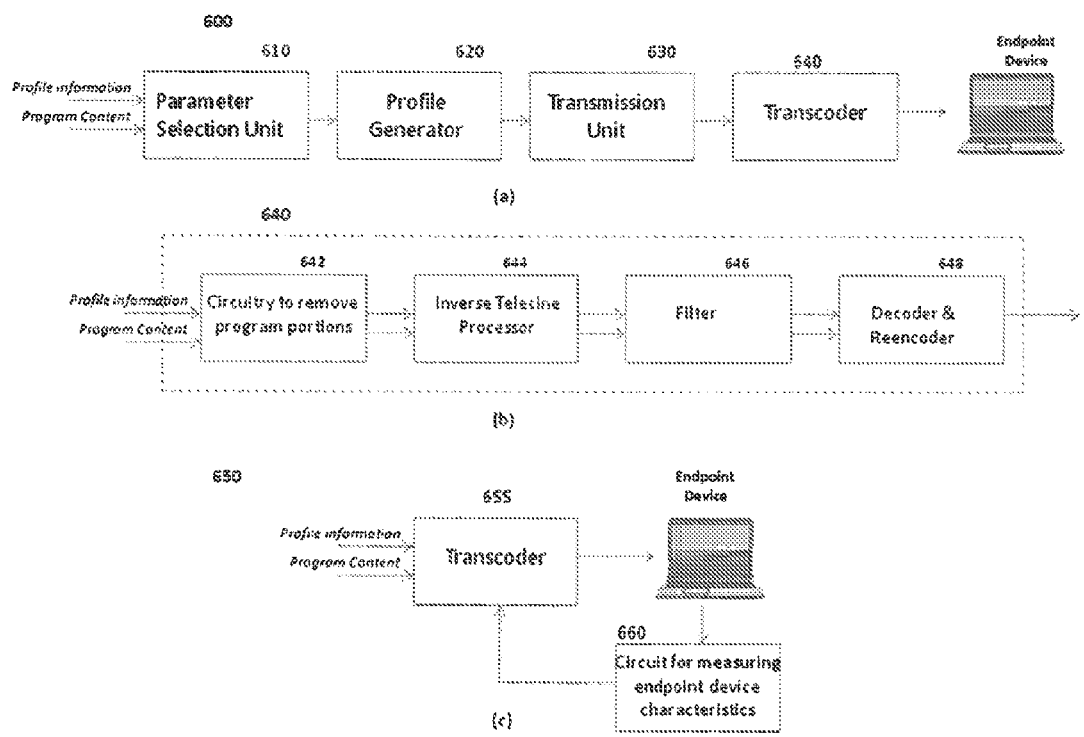
FIGS. 6a, b, and c show embodiments of an apparatus for processing video program content in accordance with the present principles.

One embodiment of an apparatus 640 for processing video program content in accordance with the present principles is illustrated in FIG. 6(a). The apparatus comprises a parameter selection unit 610 for selecting a set of parameters defining the display characteristics of video program content. The apparatus is also comprised of a profile generator 620. The output of parameter selection unit 610 is in signal communication with the input to profile generator 620. The apparatus is further comprised of a transmission unit 630 for transmitting the populated transcoding profile to a second display device. The output of profile generator 620 is in signal communication with the input to transmission unit 630. The apparatus is further comprised of a transcoder 640, whose input is in signal communication with the output of transmission unit 630, either wirelessly or with a wired connection. Transcoder 640 operates on the video program content based on at least one of the parameters so that the content is appropriate for use on a second display device.

Another exemplary embodiment of an apparatus 640 for processing video program content in accordance with the present principles further comprising the transcoder of FIG. 6(a) is illustrated in FIG. 6(b). The apparatus is comprised of circuitry 642 to remove program portions that will not be required following transcoding. The output of circuitry 420 is in signal communication with the input to an inverse telecine operator 644, which further comprises apparatus 640. The output of inverse telecine operator 644 is in signal communication with the input to filter 646, which further comprises apparatus 640, and that filters the video program content. The apparatus is further comprised of a decoder and re-encoder 648 that operates on said program content based on the profile information to optimize quality of the video content for display on the second display device. The output of filter 646 is in signal communication with the input of decoder and re-encoder 648.

A further embodiment of an apparatus 650 for processing video program content in accordance with the present principles further comprising the apparatus of FIG. 6(a) is shown in FIG. 6(c). The apparatus is comprised of the aforementioned devices of FIG. 6(a) but is also comprised of a measurement unit 660 for measuring characteristics of an endpoint device for the program content and sending the measured characteristics to the transcoder 640 of FIG. 6(a)

Figure 7:
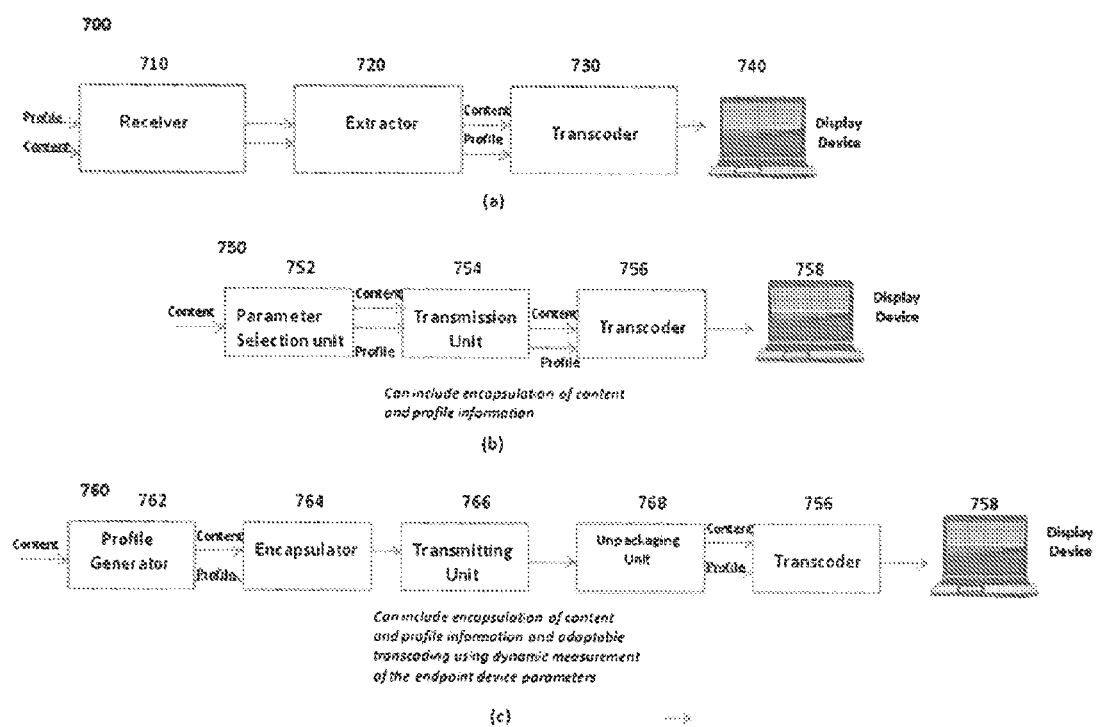
FIGS. 7a, b, and c show embodiments of an apparatus for displaying video program content in accordance with the present principles.

A further embodiment of an apparatus 700 for displaying program content in accordance with the present principles is shown in FIG. 7(a). The apparatus is comprised of a receiver 710 that receives a transcoding profile including a set of parameters for transcoding program content to be appropriate for use on a second display device. The apparatus is further comprised of an extractor 720, whose input is in signal communication with the output of receiver 710. The extractor obtains a set of parameters from the transcoding profile. The apparatus is further comprised of a transcoder 730, whose first input is in signal communication with the output of extractor 720. The transcoder also receives program content on a second input. The transcoder operates on the program content based on the set of parameters extracted from the profile. The apparatus is further comprised of a second display device 740, whose input is in signal communication with the output of transcoder 730.

Another embodiment of an apparatus 750 for displaying program content in accordance with the present principles is shown in FIG. 7(b). Apparatus 750 is comprised of parameter selection unit 752, transmission unit 754, transcoder 756, and a display device 758. Parameter selection unit 752 receives video content and selects a set of parameters defining the display characteristics of the video content. The output of parameter selection unit 752 is in signal communication with one input to transmission unit 754. A second input to transmission unit 754 receives the video content, shown in FIG. 7(b) as coming from parameter selection unit 752, but also capable of being sent from another source. The output of transmission unit 754 is in signal communication with transcoder 756. Transcoder 756 operates on the video program content using the transcoding profile parameters. The output of transcoder 756 is sent to the input to display device 758 for viewing.

Another embodiment of an apparatus 760 for displaying program content in accordance of the present principles is shown in FIG. 7(c), which further comprises the apparatus of FIG. 7(b). Apparatus 760 comprises profile generator 762, encapsulator 764, transmitting unit 766, unpackaging unit 768, transcoder 756, and display device 758. Profile generator 762 receives content at its input and populates a transcoding profile with a set of parameters. A first output of profile generator 762 represents the profile and is sent to a first input of encapsulator 764. Encapsulator 764 receives a second input from the second output of profile generator 762, representing the video program content. The output of encapsulator 764 is sent to transmitting unit 766. The output of transmitting unit 766 is in signal communication to the input of unpackaging unit 768, which performs the inverse operation of encapsulator 764. A first output of unpackaging unit 768 represents the video content and is sent to a first input of transcoder 756. A second output of unpackaging unit 768 represents the profile and is sent to a second input of transcoder 756. Transcoder 756 operates on the video content, for example, by decoding the content and re-encoding it using the parameters in the profile. The output of transcoder 756 is sent to the input to display device 758 for viewing.

One or more implementations having particular features and aspects of the presently preferred embodiments of the invention have been provided. However, features and aspects of described implementations can also be adapted for other implementations. For example, these implementations and features can be used in the context of other video devices or systems. The implementations and features need not be used in a standard.

Reference in the specification to "one embodiment" or "an embodiment" or "one implementation" or "an implementation" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

The implementations described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or computer software program). An apparatus can be implemented in, for example, appropriate hardware, software, and firmware. The methods can be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein can be embodied in a variety of different equipment or applications. Examples of such equipment include a web server, a laptop, a personal computer, a cell phone, a PDA, and other communication devices. As should be clear, the equipment can be mobile and even installed in a mobile vehicle.

Additionally, the methods can be implemented by instructions being performed by a processor, and such instructions (and/or data values produced by an implementation) can be stored on a processor-readable medium such as, for example, an integrated circuit, a software carrier or other storage device such as, for example, a hard disk, a compact disc, a random access memory ("RAM"), or a read-only memory ("ROM"). The instructions can form an application program tangibly embodied on a processor-readable medium. Instructions can be, for example, in hardware, firmware, software, or a combination. Instructions can be found in, for example, an operating system, a separate application, or a combination of the two. A processor can be characterized, therefore, as, for example, both a device configured to carry out a process and a device that includes a processor-readable medium (such as a storage device) having instructions for carrying out a process. Further, a processor-readable medium can store, in addition to or in lieu of instructions, data values produced by an implementation.

As will be evident to one of skill in the art, implementations can use all or part of the approaches described herein. The implementations can include, for example, instructions for performing a method, or data produced by one of the described embodiments.

A number of implementations have been described. Nevertheless, it will be understood that various modifications can be made. For example, elements of different implementations can be combined, supplemented, modified, or removed to produce other implementations. Additionally, one of ordinary skill will understand that other structures and processes can be substituted for those disclosed and the resulting implementations will perform at least substantially the same function(s), in at least substantially the same way(s), to achieve at least substantially the same result(s) as the implementations disclosed. Accordingly, these and other implementations are contemplated by this disclosure and are within the scope of these principles.

The invention claimed is:

1. A method for processing video program content appropriate for a first display device but not appropriate for a second display device, comprising the steps of:
   selecting a set of parameters defining display characteristics of said video program content, wherein the set of selected parameters includes at least each of aspect ratio, crop, scale, encoding bit rate, color gamut, noise reduction and pre-filtering information;
   populating a transcoding profile with each parameter in said set of parameters;
   transmitting said populated transcoding profile to said second display device; and
   transcoding said program content based on each of said selected parameters to be appropriate to use with said second display device.

2. The method of claim 1, further comprising:
   analyzing said program content; and
   selecting said set of parameters responsive to said analyzing step.

3. The method of claim 2, wherein said set of selected parameters further includes one or more parameters from a list comprising: class of program content, resolution, frame rate, frame sequence, progressive or interlace, color space, noise level, bit depth, and animation status.

4. The method of claim 1, said transcoding step comprising:
   removing portions of said program content that are not required after transcoding;
   performing an inverse telecine operation on said program content;
   filtering said program content; and
   decoding and re-encoding said program content based on said profile information to optimize quality for use on an endpoint device.

5. The method of claim 1, further comprising:
measuring characteristics of an endpoint device for said program content; and wherein said transcoding step is based on said measured characteristics.

6. The method of claim 5, said measuring step comprising:
measuring bandwidth and status of a connection between a transcoding device and at least one endpoint device.

7. The method of claim 1, further comprising the steps of:
encapsulating the profile information and the program content before said transmitting step; and
unpackaging said encapsulated profile information and program content before said transcoding step.

8. An apparatus for processing video program content appropriate for a first display device but not appropriate for a second display device, comprising:
a parameter selection unit to select a set of parameters defining display characteristics of said video program content, wherein the set of selected parameters includes at least each of aspect ratio, crop, scale, encoding bit rate, color gamut, noise reduction and pre-filtering information;
a profile generator to populate a transcoding profile with each parameter in said set of selected parameters;
a transmission unit for transmitting said populated transcoding profile to said second display device; and,
a transcoder that operates on said program content based on each of said selected parameters to be appropriate for use with said second display device.

9. The apparatus of claim 8, further comprising:
an analyzer for evaluating program content and producing an output; and
a parameter selection unit for selecting said set of parameters in response to output of said analyzer.

10. The apparatus of claim 9, wherein said set of selected parameters further includes one or more parameters from a list comprising: class of program content, resolution, frame rate, frame sequence, progressive or interlace, color space, noise level, bit depth, and animation status.

11. The apparatus of claim 8, said transcoder further comprising:
circuitry to remove program portions of said program content that are not required after transcoding;
an inverse telecine operator for said program content;
a filter operating on said program content; and
a decoder and re-encoder operating on said program content based on said profile information to optimize quality for use on an endpoint device.

12. The apparatus of claim 8, further comprising:
a measurement unit for measuring characteristics of an endpoint device for said program content, wherein said transcoder operates using said measured characteristics.

13. The apparatus of claim 12, wherein said measurement unit measures bandwidth and status of a connection between a transcoding device and at least one endpoint device.

14. The apparatus of claim 8, further comprising:
an encapsulator for encapsulating the profile information and the program content before operation of said transmission unit; and
an unpackaging unit operating on said encapsulated profile information and program content before operation of said transcoder.

* * * * *